US009596346B1

(12) United States Patent
Racine et al.

(10) Patent No.: US 9,596,346 B1
(45) Date of Patent: Mar. 14, 2017

(54) METHOD FOR DECOUPLING CALLER ROUTING SERVICES AND OFF-NET DATA ACQUISITION

(71) Applicant: 800 RESPONSE INFORMATION SERVICES LLC, Burlington, VT (US)

(72) Inventors: Matthew Racine, Colchester, VT (US); Douglas Smith, Bolton, VT (US)

(73) Assignee: 800 RESPONSE INFORMATION SERVICES LLC, Burlington, VT (US)

( * ) Notice: Subject to any disclaimer, the term of this patent is extended or adjusted under 35 U.S.C. 154(b) by 0 days.

(21) Appl. No.: 15/167,191

(22) Filed: May 27, 2016

(51) Int. Cl.
| H04M 1/56 | (2006.01) |
| H04M 15/06 | (2006.01) |
| H04M 3/42 | (2006.01) |
| H04M 3/493 | (2006.01) |

(52) U.S. Cl.
CPC ... H04M 3/42357 (2013.01); H04M 3/42306 (2013.01); H04M 3/493 (2013.01)

(58) Field of Classification Search
CPC ....... H04B 7/26; H04L 67/18; H04L 12/6402; H04M 3/4872; H04M 3/00; H04M 11/04; H04M 3/42; H04M 3/5116; H04M 7/1285; H04M 2242/04; H04M 2242/14; H04M 2242/30; H04M 2213/13072; H04Q 3/0039; H04Q 2213/13097; H04Q 2213/13098; H04Q 2213/13103; H04Q 2213/13141; A61B 6/032; A61B 6/14; A61B 6/501; A61B 6/542; H04W 40/20; H04W 4/023; H04W 4/16; H04W 4/02

USPC .............. 379/142.01, 142.1, 201.01, 201.07, 379/201.08, 207.12, 207.13, 207.14, 379/207.15, 220.01, 365.01, 265.02, 309; 370/351, 352, 353, 354, 356, 357, 401; 455/445, 456.2, 456.3
See application file for complete search history.

(56) References Cited

U.S. PATENT DOCUMENTS

| 4,757,267 A | * | 7/1988 | Riskin ................. | H04M 3/4228 379/114.24 |
| 5,588,048 A | * | 12/1996 | Neville ............... | H04M 3/4872 379/127.01 |
| 5,805,689 A | * | 9/1998 | Neville ............... | H04M 3/4872 379/211.02 |

(Continued)

Primary Examiner — Binh Tieu
(74) Attorney, Agent, or Firm — Greenblum & Bernstein, P.L.C.

(57) ABSTRACT

Call routing system and method for routing calls based upon an initiator's current location in a wireless communications network. The call routing system includes an interface to receive incoming communications directed to an identifier identifying different geographic locations of destination party. Interactive unit interacts with off-network providers. Call routing process is created to determine, based on the current location of the initiator, which geographic location to direct the communication and gateway mediation process is created to inquire from off-network service the current location of the initiator, to receive location data related to the initiator's current location, and to return the received location data to the call routing process. Interactive unit is configured to terminate communication to geographic location of the destination party based on the initiator's current location. Incoming communication and terminating communication are bridged at interactive unit.

21 Claims, 8 Drawing Sheets

(56) References Cited

U.S. PATENT DOCUMENTS

| | | | |
|---|---|---|---|
| 6,529,735 B1* | 3/2003 | De Brito | H04B 7/26 455/456.1 |
| 6,771,742 B2* | 8/2004 | McCalmont | H04M 3/42 379/37 |
| 6,879,676 B1* | 4/2005 | Contractor | H04Q 3/0029 379/211.01 |
| 6,963,557 B2* | 11/2005 | Knox | H04L 12/6402 370/352 |
| 7,493,125 B2 | 2/2009 | Nagesh | |
| 8,731,515 B2 | 5/2014 | Muhonen | |
| 9,414,294 B2* | 8/2016 | Racine | H04W 40/20 |
| 2003/0086539 A1* | 5/2003 | McCalmont | H04M 3/42 379/45 |
| 2004/0062237 A1* | 4/2004 | MacArthur | H04L 45/00 370/356 |
| 2006/0121904 A1 | 6/2006 | Reuhkala | |
| 2009/0225959 A1* | 9/2009 | Sierra | H04M 3/42229 379/88.01 |
| 2010/0029272 A1 | 2/2010 | McCann | |
| 2010/0157986 A1* | 6/2010 | Rao | H04L 29/1216 370/352 |
| 2015/0031373 A1* | 1/2015 | Racine | H04W 40/20 455/445 |
| 2016/0269968 A1* | 9/2016 | Racine | H04W 40/20 |

* cited by examiner

METHOD FOR DECOUPLING CALLER ROUTING SERVICES AND OFF-NET DATA ACQUISITION

CROSS-REFERENCE TO RELATED APPLICATION

The instant application is related to U.S. application Ser. No. 14/317,509 filed Jun. 27, 2014, which claims the benefit under 35 U.S.C. §119(e) of U.S. Provisional Application No. 61/858,356 filed Jul. 25, 2013, the disclosures of which are expressly incorporated by reference in their entireties.

BACKGROUND OF THE INVENTION

1. Field of the Invention

Embodiments of the present invention pertain to a system and method for properly routing telephone calls made by callers using the public telecommunications network. Specifically, embodiments relate to a method for incorporating a commercial location and data services that reside on remote computer networks and are available only via so-called web services, into an interactive voice response system to provide superior call routing and caller abandon rates.

2. Discussion of Background Information

The workhorse of the public telecommunications network, plain old telephone service (POTS) has historically been highly geographic in nature: every POTS number is essentially tied to a loop of copper from the local telephone company facility to its subscribers' homes or offices. The original design of the landline network, together with the rules used to assign telephone numbers to these facilities, resulted in a dependable and reasonably accurate correlation between a caller's telephone number and their physical, geographic location.

Many businesses still rely upon this correlation in order to properly handle inbound calls using special techniques to route callers to the office, store or service location that best pertains to some aspect of the caller's location, e.g., geographic coordinates, state, county, zip code, time zone, et al. In addition, some businesses require the caller's location in order to determine the appropriate interactive voice response (IVR) treatment, i.e., direct termination, call-prompt, county-routing, etc. The location of the caller is inferred by cross-referencing the area code and exchange of the caller's telephone number with telecommunications databases which give the geographic location of the local telephone company's facility that provides service to the caller.

Such databases are readily available from a number of sources, e.g. Telcordia Technology's "Local Exchange Routing Guide"; these databases are normally uploaded to a data storage and retrieval facility which is housed close to the equipment used to route calls, and are accessible via an internal local area network; such databases are said to be "on-net". In general, on-net assets reside on high performance hardware and networks, with very low levels of latency and errors. Call routing services use on-net databases to determine the appropriate service location for a given inbound call.

Several factors have combined to significantly erode the correlation between caller's telephone numbers and their geographic location. Most notable is the proliferation of mobile telephones, which surpassed landline telephones in 2005; by 2013, more than one-third of Americans relied solely on their mobile phone, and a mobile phone was the primary telephone in more than half of US households. Although some of these devices are used within their original area codes' service areas, rarely are they used exclusively at the subscribers' homes, and frequently they're used outside their original area codes' service areas.

In addition, changes in the way blocks of new telephone numbers are assigned to telecommunications carriers, including wireless carriers, and especially those carriers whose networks are based on "voice over IP" (VoIP) technology, and a de facto loosening of the rules used to assign numbers to underlying facilities, have also served to compromise the correlation between telephone number and inferred location.

All of these factors have combined to make it increasingly problematic to provide proper routing for inbound telephone calls.

Since the nature of wireless telecommunications requires that wireless carriers know the physical location of mobile devices, wireless carriers have designed and built the appropriate location technologies into their wireless communications networks and control systems. Wireless carriers have leveraged these capabilities to offer a variety of so-called "location-based services" (LBS) directly to their own subscribers; they also offer access to their networks' location platforms to qualified aggregators. These aggregators function as a clearinghouse, providing a wide range of value-added services that seamlessly span a number of disparate wireless carriers. For example, Syniverse is a location-based service provider, offering access to the latitude and longitude of a number of wireless carriers' mobile subscribers, via real-time queries and common web-based application objects, over the public internet. Due to the fact that this information is derived from network telemetry in real-time, it can only be accessed remotely.

Access to other telecommunications databases is readily available; such databases contain a range of information about telephone numbers, including billing addresses. For example, AT&T's "Information Retrieval Service" provides a wide variety of information about a given telephone number, and Neustar's "Power Port Search" provides access to a number of authoritative telecommunications databases—again, via real-time queries and common web-based application objects, over the public internet. Due to the size, complexity, fluidity, and proprietary nature of these databases, it is not feasible that they would be downloaded to others' platforms—they are only accessible remotely, via the technologies described above.

Such remotely accessible real-time information and databases are said to be "off-net". In general, off-net assets tend to have a very different performance profile: retrieval times are often measured in seconds, as opposed to milliseconds; for example, the time required to derive the location of a mobile caller can vary from 4 to 16 seconds. Error rates can also be orders of magnitude higher; whereas an on-net database might have an error rate of 108, the figure for an off-net service could reasonably be $10^{-2}$.

The difference between on-net and off-net performance figures is all the more critical in light of the abandon rates for calls processed by IVRs, which tend to rise dramatically the longer a caller must wait for their call to be routed.

What is wanted, then, is a technique that allows the IVR to manage a caller's telephone experience independently of the off-net application gateways' performance characteristics—a technique that affords call routing services the ability to interact with off-net providers to obtain critical routing data, while at the same time retaining the flexibility to manage that interaction using best practices for interactive voice response.

Note that although networks and systems based on E911 technologies are indeed capable of routing calls based on location, these algorithms are entirely unsuited for commercial use, due to the length of time required to route the call. Emergency callers have no alternative but to wait up to 30-45 seconds for the network to resolve their location; it is common experience that someone calling in response to a billboard, print or radio advertisement would abandon the call in a small fraction of this time.

SUMMARY OF THE EMBODIMENTS

For the purpose of this invention, an "Interactive Voice Response unit" (IVR) is a computer controlled system, which can be a collection of computer hardware and software, that accepts incoming telephone calls and routes said telephone calls.

For the further purpose of this invention, "routing a telephone call" refers to the execution of the appropriate voice prompts and computer algorithms in conjunction with database tables and application gateways of other, e.g., third party, service providers to determine the service location to which an incoming telephone call should be delivered.

For the further purpose of this invention, an "inbound telephone call" refers to the event of a telephone subscriber placing a call, and subsequent presentation of that call to the telecommunications carrier which has ultimate responsibility for delivering the call to the proper service location.

For the further purpose of this invention, "application gateway web services" refers to commercial information services that are accessible over internet protocol-based networks via web application programming interfaces (APIs) built around Representational State Transfer (REST) protocols, which rely on Javascript Object Notation (JSON) for message format and the Hypertext Transmission Protocol (HTTP) for message negotiation and transmission.

For the further purpose of this invention, "request payload" refers to the collection of information necessary to make a complete and well-formed query to an application gateway's web service; "response payload" refers to the collection of information returned from the gateway in response to such queries.

Since callers expect calls to be routed quickly, and since application gateways have distinct performance and latency profiles which are significantly less predictable than local data stores and can vary over time within and across gateways, it is a further aspect of this invention to provide a method to allow an IVR to avail itself of a separate software agent to mediate the interaction between the IVR program execution and the third parties' application gateways' web services, essentially decoupling the callers' telephone experience from the gateways' performance.

It is a further aspect of this invention to provide a technique whereby, if an inbound call cannot be successfully routed, the IVR will send the call to a call center to be routed manually, or will simply route the call on the basis of the location attributes of the caller's telephone number itself.

It is a further aspect of this invention to provide a method whereby, after having obtained a caller's location data, e.g., latitude and longitude coordinates, from an application gateway web service, the IVR can translate that data, e.g., coordinates, into other pertinent location attributes which may be required in order to properly route the call, e.g., telephone area code and exchange, zip code, county, and time zone.

Embodiments of the invention are directed to a call system for bridging a communication connection between an initiator and a destination party based upon a current location of the initiator within a wireless communications network. The calling system includes a communication interface configured to receive from the initiator an incoming communication directed to an identifier of the destination party, which identifies a number of different geographic locations in which the destination party is located; and an interactive unit configured to interact with off-network third party service providers via application gateways of the off-network third party service providers, the interactive unit comprising a communications control service operable to bridge at the communication interface the incoming communication of the initiator with one of the geographic locations of the destination party, based on the current location of the initiator. A call routing process is created by the communication control service to determine, based on a current location of the initiator, which of the geographic locations of the destination party the incoming communication should be directed; and a gateway mediation is process created by the call routing process to communicate with least one of the off-network third party service providers to inquire as to the current location of the initiator and to receive location data related to the initiator's current location, and to return the received location data to the call routing process. The call routing process is further configured to determine the initiator's current location from the received location data, to determine to which of the different geographic locations in which the destination party is located is the one of the geographic locations of the destination party to which the incoming communication should directed, and to return the one of the geographic locations of the destination party to the communications control service; and the communications control services is further configured establish a terminating communication to the one of the geographic locations of the destination party based on the initiator's current location via the communications network interface, whereby the incoming communication and the terminating communication are bridged at the communication interface. The incoming call does not originate over a land line device.

According to embodiments, the incoming communication can originate from one of a cell phone, voice over IP system, or the Internet.

In accordance with other embodiments, the call routing system may also include a database storing a plurality of sounds; and a processor configured to transmit at least some of the plurality of sounds to the initiator in a time period between the creation of the gateway mediation process and the response received from the off-network third party service providers.

In other embodiments, via peer creation, the gateway mediation process can be created by a gateway request from the call routing process that comprises a request identifier and a service request payload. The received location data returned to the call routing process from the gateway mediation process may include the request identifier and a response payload comprising the received location data. Further, a separate gateway mediation process may be created for each of the off-network third party location services. Also, new mediation processes can be created for each new incoming communication.

According to still other embodiments of the invention, after returning the received location data to the call routing process, the gateway mediation process can be terminated.

In other embodiments, after returning the one of the geographic locations of the destination party to the communications control service, the call routing process can be terminated.

In accordance with still other embodiments, the received location data may include at least a latitude and longitude for the initiator's current location.

In other embodiments, the call routing process may be configured to determine from the latitude and longitude of the initiator's current location to at least one of: an area code and exchange; a zip code; a county; and a time zone.

According to still other embodiments, the identifier of the destination party can be a toll free telephone number or an Internet website.

Embodiments of the invention are directed to a method for bridging a communication connection between an initiator and a destination party based upon a current location of the initiator within a wireless communications network. The method includes receiving from the initiator an incoming communication directed to an identifier of the destination party, which identifies a number of different geographic locations in which the destination party is located and interacting, via an interactive unit comprising a communications control service, with off-network third party service providers via application gateways of the off-network third party service providers by:

creating a call routing process to determine, based on a current location of the initiator, which of the geographic locations of the destination party the incoming communication should be directed; creating a gateway mediation process to communicate with least one of the off-network third party service providers to inquire as to the current location of the initiator and to receive location data related to the initiator's current location, and to return the received location data to the call routing process, so that the call routing process further determines the initiator's current location from the received location data, determines to which of the different geographic locations in which the destination party is located is the one of the geographic locations of the destination party to which the incoming communication should directed, and returns the one of the geographic locations of the destination party to the communications control service.

The method also includes establishing a terminating communication to the one of the geographic locations of the destination party based on the initiator's current location via the communications control service, whereby the incoming communication and the terminating communication are bridged at the interactive unit. The incoming call does not originate over a land line device.

According to embodiments, the incoming communication can originate from one of a cell phone, voice over IP system or the Internet.

In accordance with other embodiments of the invention, the returned received location data can include data points in a coordinate system, and the method further comprises converting the data points to at least one of: an area code and exchange; a zip code; a county; and a time zone.

In other embodiments, the creating of the gateway mediation process may include peer creation of a gateway request from the call routing process that comprises a request identifier and a service request payload.

In still other embodiments, the received location data returned to the call routing process from the gateway mediation process can include the request identifier and a response payload comprising the received location data.

According to other embodiments, a separate gateway mediation process may be created for each of the off-network third party location services.

In other embodiments, new mediation processes can be created for each new incoming communication.

According to still other embodiments, after returning the received location data to the call routing process, the method further may include terminating the gateway mediation process.

In accordance with still yet other embodiments of the present invention, after returning the one of the geographic locations of the destination party to the communications control service, the method can further include terminating the call routing process.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
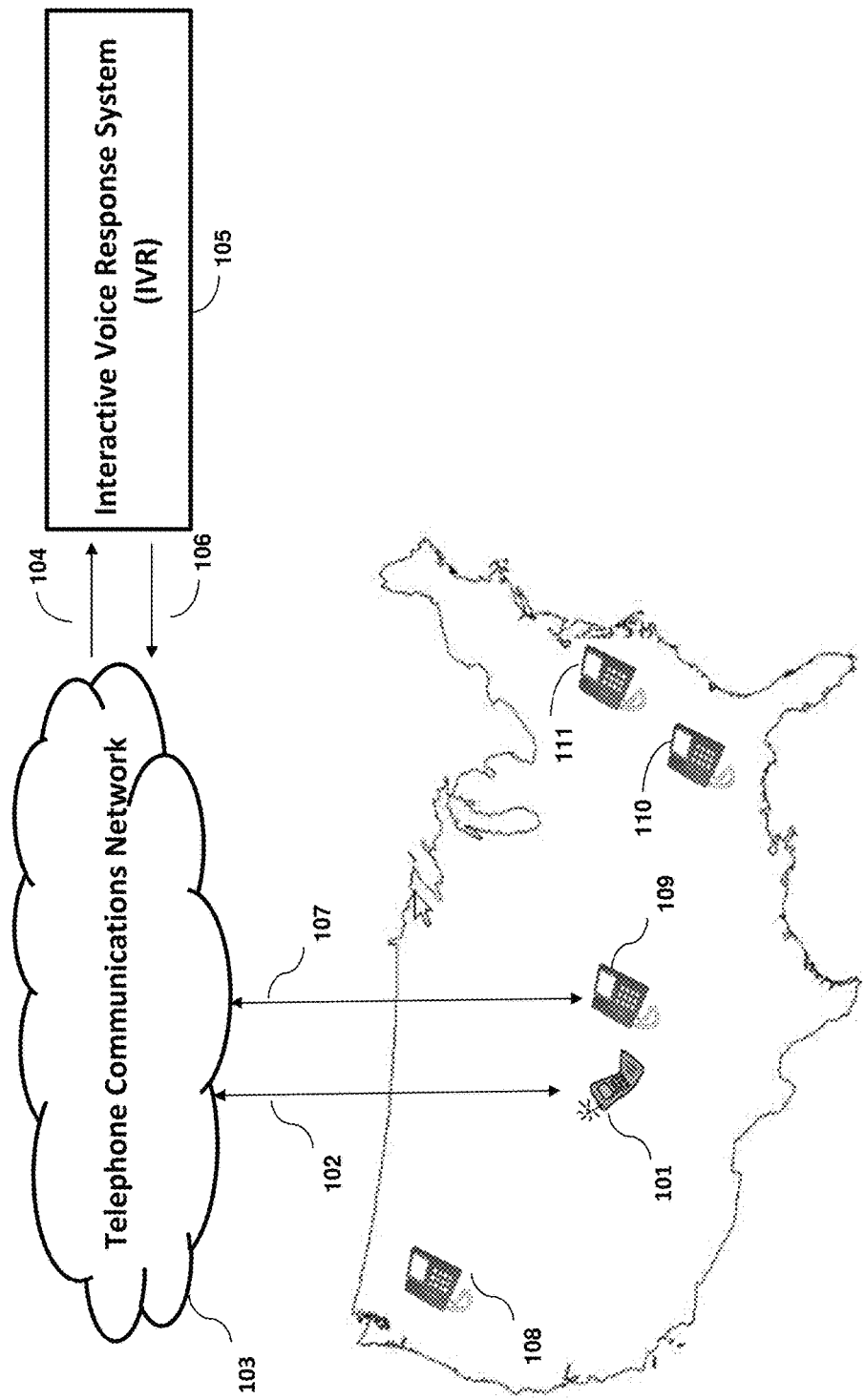
FIG. 1 illustrates a connection of an incoming call to a termination point via an interactive voice response (IVR) system.

FIG. 1 illustrates a subscriber 101 making an inbound call 102 to a telephone number they want to reach (i.e., the "wanted number") via the telephone communications network 103, delivery of that call 104 to an interactive voice response unit (IVR) which determines the proper termination point from among numerous possibilities 108 through 111, and finally a separate outbound call 106, termination of that call to the appropriate service location 109, at which point the two legs 104 and 106 are bridged in the IVR 105.

Figure 2:
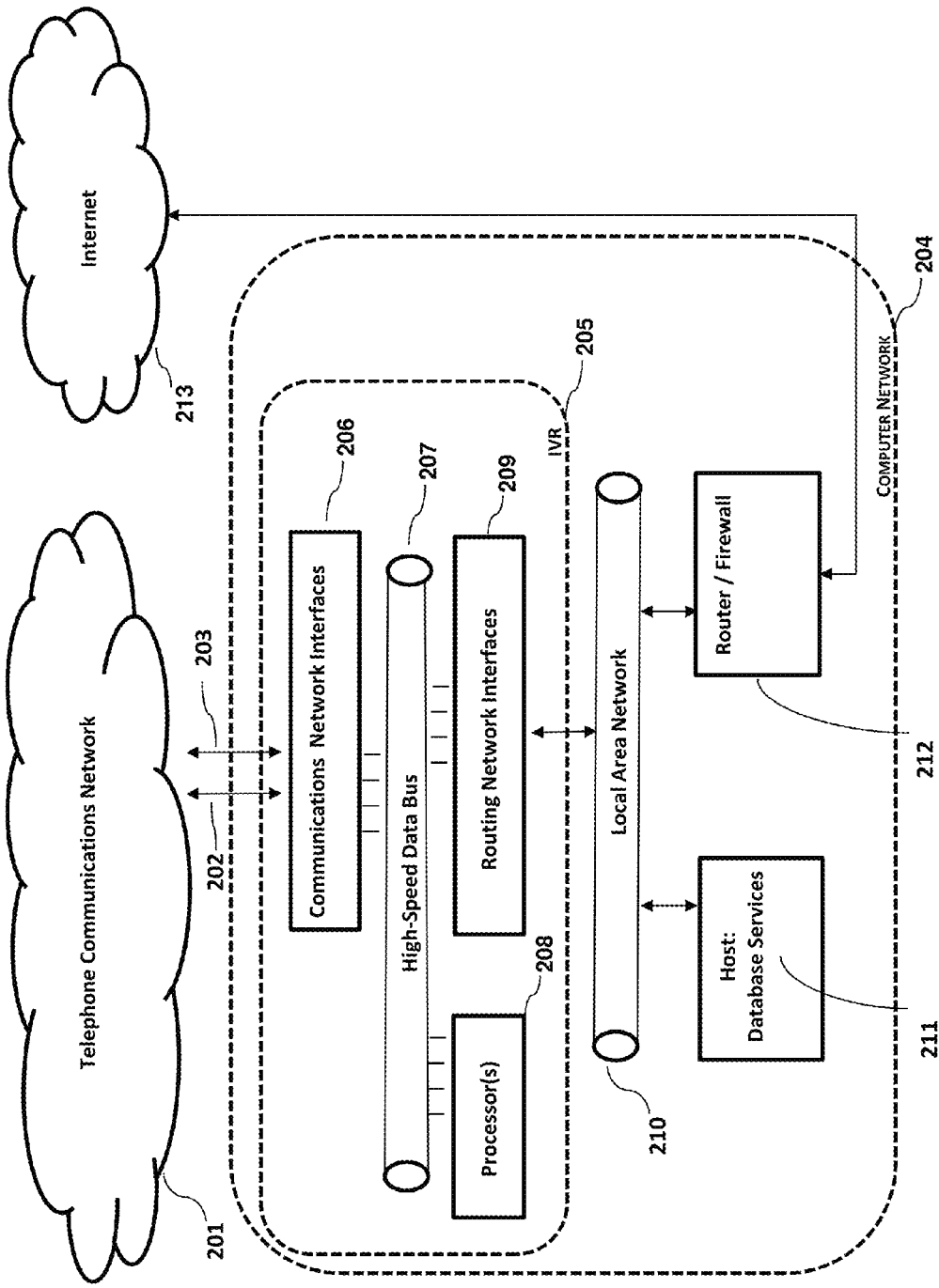
FIG. 2 schematically illustrates the structure of the IVR.

FIG. 2 is a schematic diagram showing an IVR and computer network which could be used to host a representative instance of the invention. The Telephone Communications Network 201 sends inbound calls 202 from subscribers to the IVR, and accepts outbound calls 203 to the appropriate service location; the IVR and computer network 204 are comprised of the IVR 205 described below, a local area data network 210 which provides internet-protocol (IP)-based communications to other host computers in the platform, which host database servers 211, and access to the Internet 213 via a router and/or firewall 212. The IVR 205 is comprised of communications network interfaces 206 which provide the digital signaling processing circuitry required to interoperate with the telecommunications network, logic processors 208 comprising one or more computer central processing units, computer memory, and various software used to provide basic operating system services and call-routing application logic, routing network interfaces 209 used to provide access to other platform components, and a high-speed data bus 207 used to interconnect the IVR's components.

Figure 3:
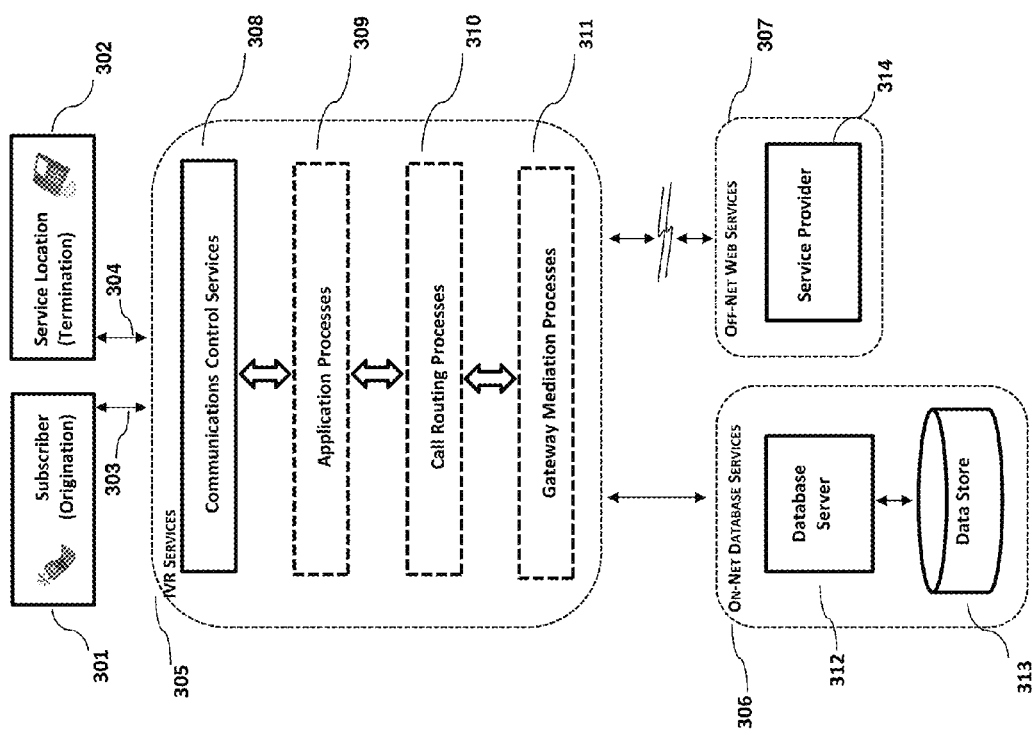
FIG. 3 illustrates the functional features of the IVR.

FIG. 3 is a schematic diagram showing the service components used by the IVR to route calls. Subscriber 301 makes an inbound call 303; several software agents are then brought into play to deliver that call to the proper service location 302: IVR Services 305 run on the IVR host computer, and are comprised of a) a communications control service 308 to provide basic telephonic services such as answering calls, making calls, bridging and managing calls, b) applications processes 309 to handle the interactions with the caller, if any, including playing voice prompts and gathering keypad or spoken input from the caller that is necessary for determining how to route the call, c) call routing processes 310 to derive the proper service location and termination point 302, and d) gateway mediation processes 311 to access off-net 307 service providers 314 located "off-net", that is, outside the local network. The communication control service 308 is presented via a software agent that executes continuously over time, whereas the application 309, call routing 310 and gateway mediation processes 311 are presented via software agents that are separately created and terminated for each new call, and execute only as long as required to perform specific tasks. The communication control service 308 then makes a separate outbound call 304 to that proper service termination point 302 and bridges the two calls 303 and 304 at the IVR's communications network interface.

On-net database services 306 are used by application processes 309 and call routing processes 310 to perform queries directed to an on-net database server 312 that retrieve information from master routing tables stored in local database stores 313. When a call routing process 310 must query an off-net service provider 314 in order to derive the proper service termination point for a given call, a gateway mediation process 311 is wanted to ensure that such decisions are made timely, due to the operational characteristics of off-net web services 307, i.e., higher and more variable query latency and error rates.

Figure 4:
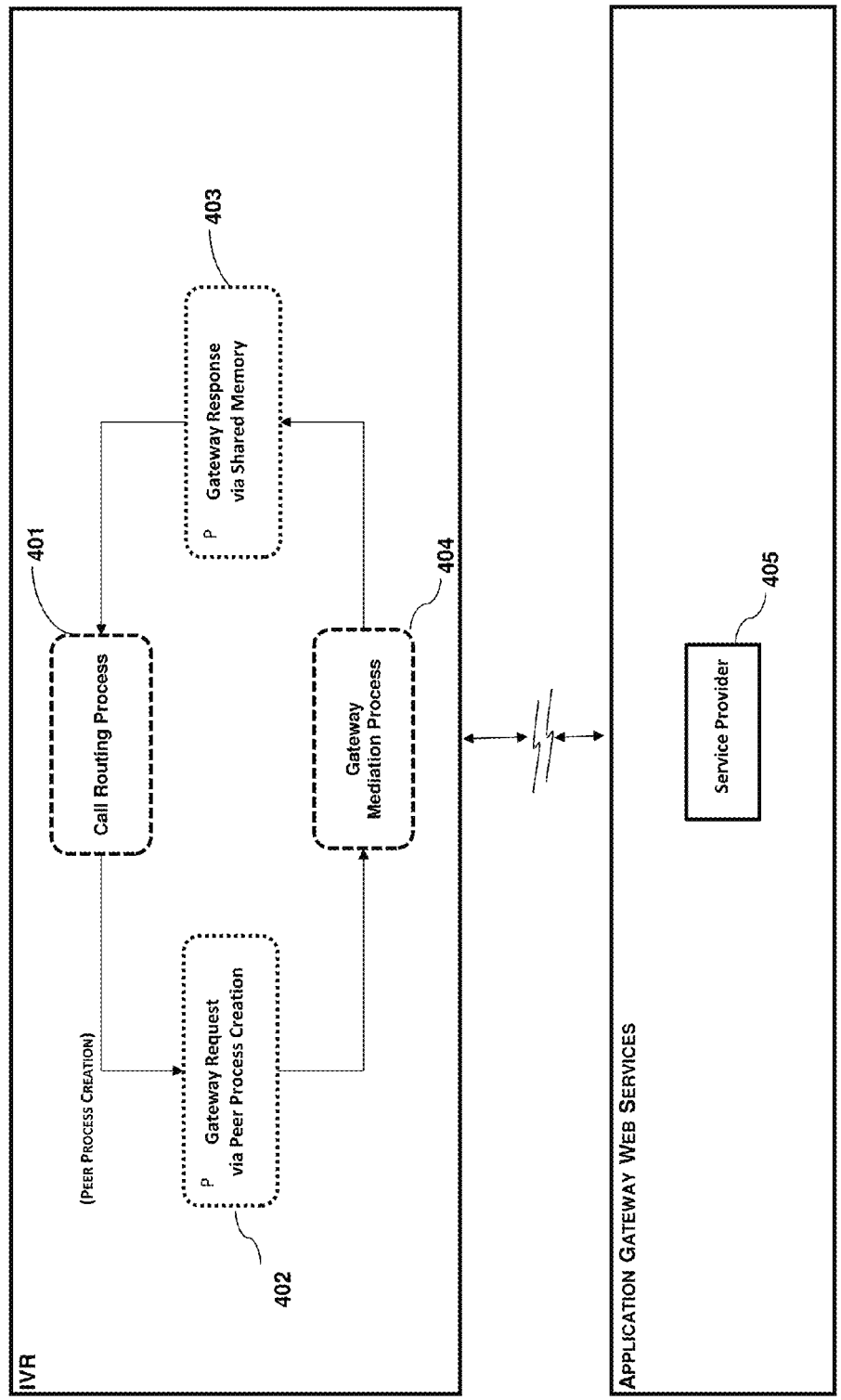
FIG. 4 schematically illustrates a gateway mediation process to decouple the call routing process from a service provider.

FIG. 4 is a schematic diagram showing a procedure flow between an IVR call routing process 401 and a gateway mediation process 404 by which IVR call routing is decoupled from the off-net service providers' application gateways' web services. In lieu of making a direct off-net query itself, a given call routing process 401 instead creates and simultaneously asserts a gateway request 402 to a separate and dedicated peer process 404 that is responsible for interacting with the off-net service provider 405. This peer process, the gateway mediation process 404, asserts a web service request to the off-net service provider 405 and awaits a reply, which is finally stored in the shared memory object 403. A single call routing process 401 may also create multiple separate gateway mediation processes 404 to request information from multiple separate off-net service providers; in this case, the separate responses 403 may be combined, or only the first response used, in order to route the call. In the preferred embodiment for this invention, the call routing processes 401 and gateway mediation processes 404 would run on a dedicated host, under CentOS 6 Linux operating system or a more recent release; the shared memory object would be implemented via a Linux "named pipe".

Figure 5:
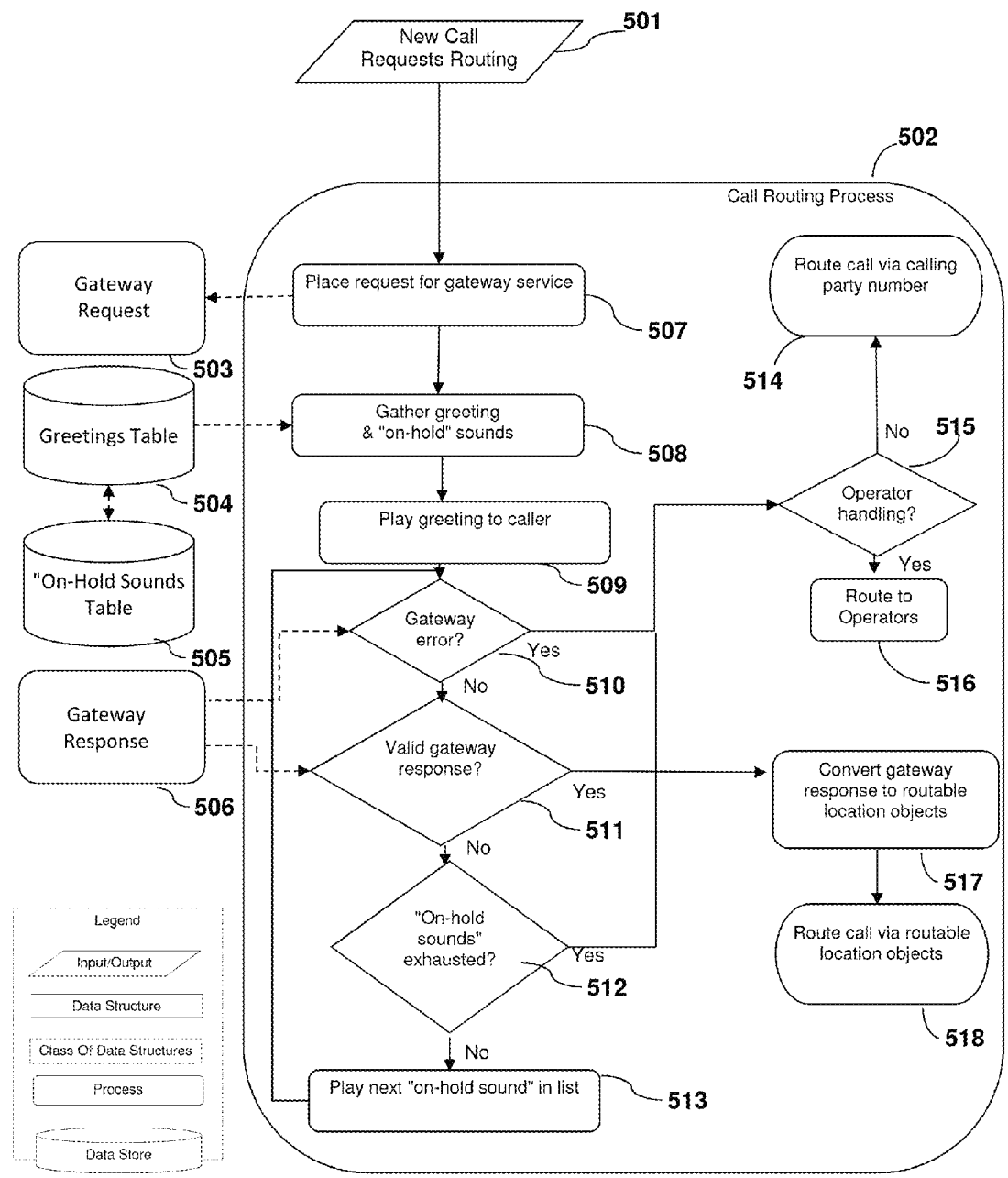
FIG. 5 illustrates a flow diagram of an embodiment of the request and receipt of location data in concert with IVR events designed to minimize call abandon rates.

FIG. 5 is a procedural flowchart showing the technique used by an IVR's call routing process to isolate incoming callers' real-time interactions with the IVR from the wide range of latency and errors inherent in the operations of the applications gateways' web services, in order to minimize the length of time callers must wait for calls to be routed, and hence to minimize the call abandon rate. The greetings table 504 contains a single record associated with each wanted number; each record contains a pointer to an audio file that contains a greeting which the IVR will play to the caller when it answers a call to that wanted number, and a pointer to a plurality of related records in the "on-hold sounds" table 505; each record in the "on-hold sounds" table contains an identifying key, a pointer to an audio file containing an "on-hold sound" fragment, and a sequence number. A group of records in table 505 that share a common identifying key will specify the sounds which the IVR will play to the caller 512 and the sequence in which the sounds will be played.

When a given call requires information from an off-net service provider in order to determine its proper service termination point 501, that call's call routing process 502 will launch 507 a gateway request via peer process creation 503. Next, the process will gather 508 the related audio file pointers from the greetings table 504 and the "on-hold" sounds table 505, and play the greeting audio file to the caller 509.

The call routing process will then check for the existence of the memory object that it shares with the gateway mediation process 510 and which is used to return the response from the off-net service provider or an error condition. If the shared memory object is found, and if the response is not an error 513, then the call routing process derives from the response a set of pertinent routable location objects 517 and the call is routed 518; if the response is an error 513, then the call is either 515 routed using the calling party's telephone number 514 or sent to an operator 516. If the shared memory object is not found, then, if the collection of pertinent "on-hold" sounds has not been exhausted 511, the next "on-hold" sound in sequence is played to the caller 512, and the process described in this paragraph is begun again; otherwise, when the collection of pertinent "on-hold" sounds has been exhausted 511, the call is either routed using the calling party's telephone number 514 or sent to an operator 516.

Figure 6:
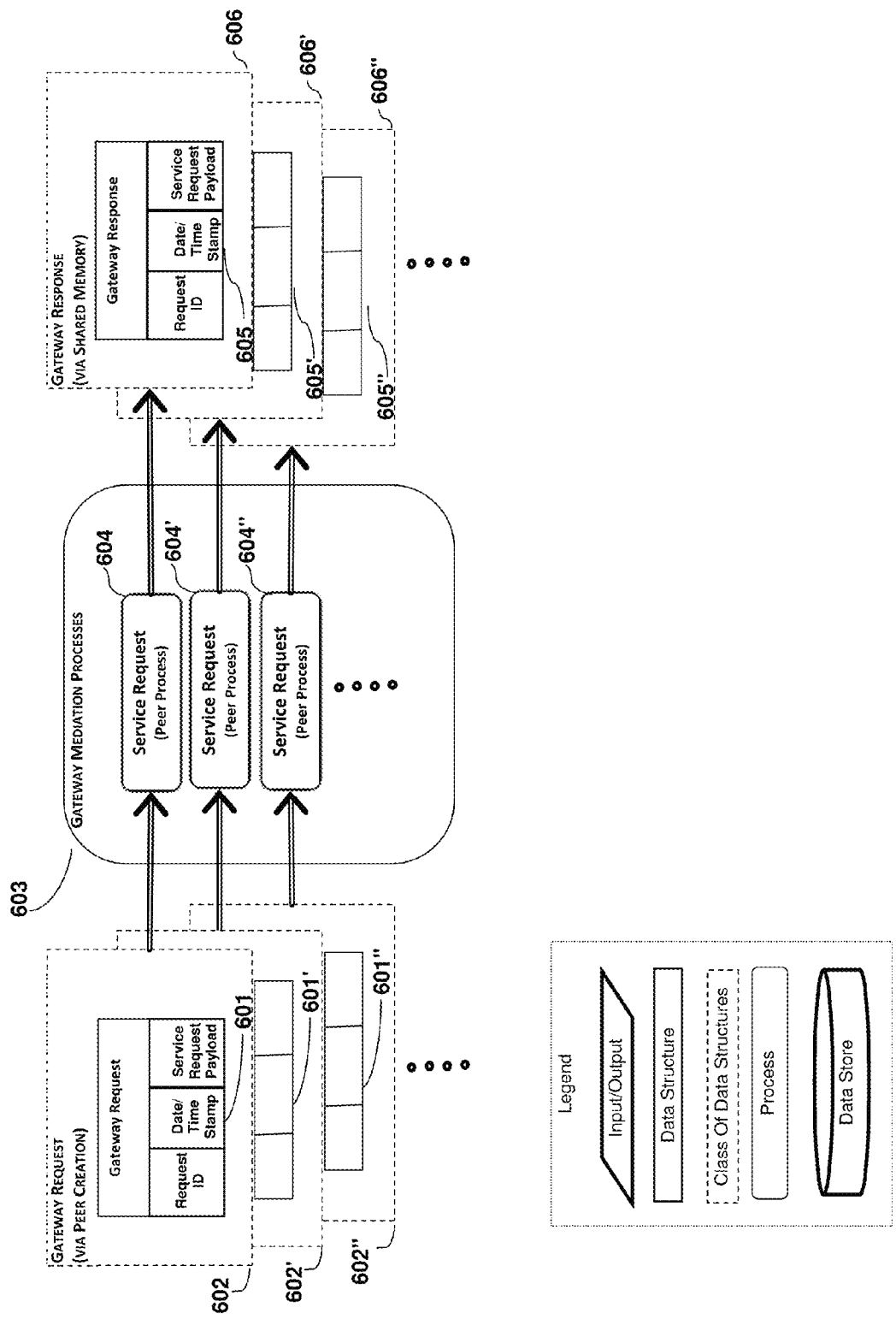
FIG. 6 illustrates functional features of gateway mediation processes.

FIG. 6 is a schematic diagram showing the internal structures 601, 601', 601", . . . and 605, 605', 605", . . . of the separate gateway requests 602, 602', 602", . . . and separate gateway responses 606, 606', 606", . . . , respectively, and their relationship to their separate respective dedicated gateway mediation processes 604, 604', 604", . . . . Each dedicated gateway mediation process 604, et al, builds and submits the appropriate application gateway REST-ful web service request, which requests are comprised of JSON messages containing queries that conform to the syntax of the gateway's specific application programming interface. After submitting such a request, each process 604, et al, then awaits a reply from the application gateway, places the reply in the gateway response shared memory object, and terminates.

Figure 7:
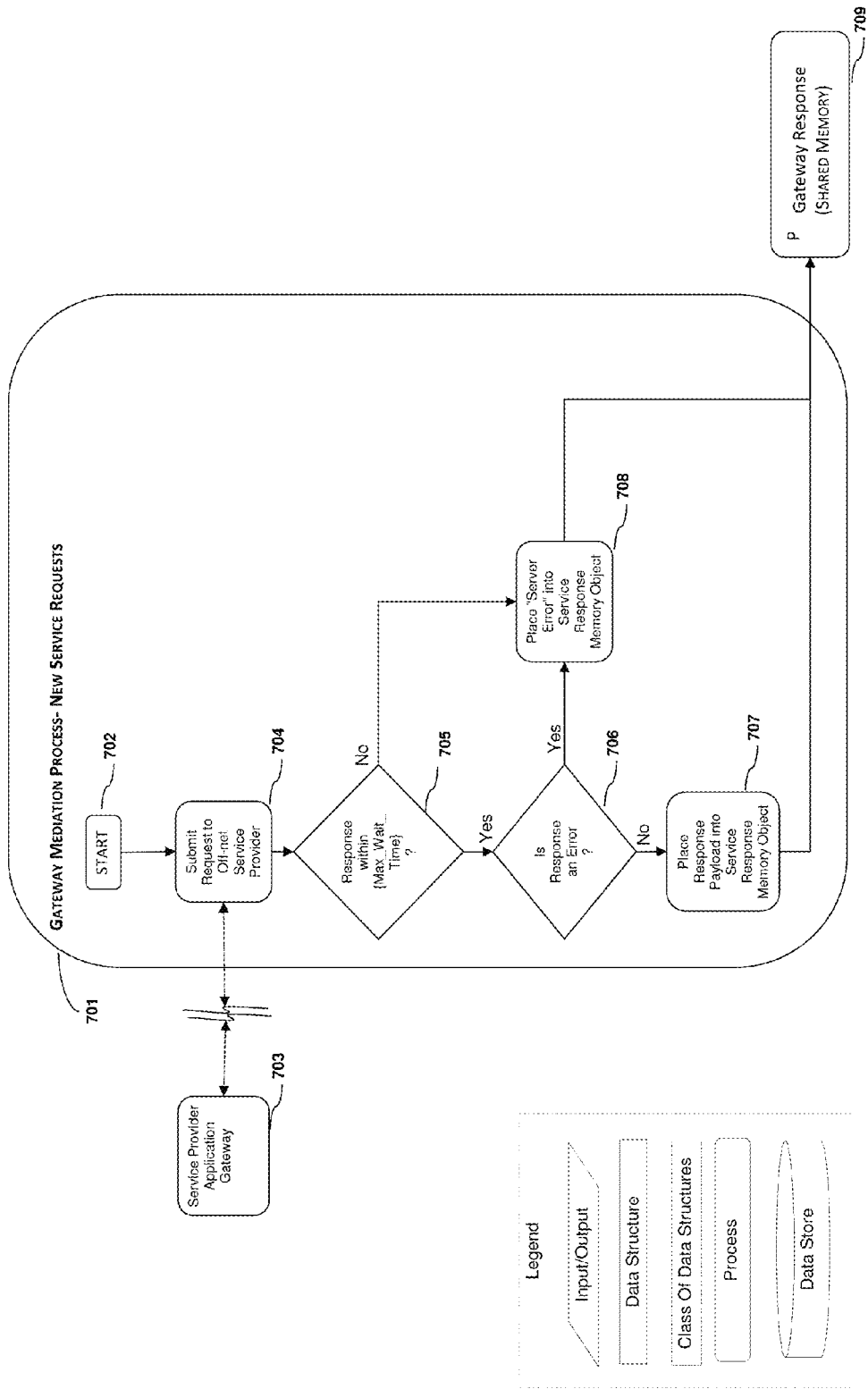
FIG. 7 illustrates a flow diagram of an embodiment of the gateway mediation process for transmittal of a new service request.

FIG. 7 is a procedural flowchart showing the technique used by a gateway mediation process 701 to submit to off-net service providers' gateways 703 REST-ful web service requests 704 comprised of JSON messages containing queries that conform to the syntax of the gateway's specific application programming interface. If a gateway response is received within {Max_Wait_Time} 705, e.g., 12 seconds, and if the response is not an error 706, then the gateway's response, e.g., a JSON message containing a wireless caller's latitude and longitude is placed into a shared memory object 707; otherwise, when the gateway response is an error, a JSON message denoting the error condition is placed into a shared memory object 708. The act of placing the gateway response into the shared memory object 708 returns the response to the call routing process 401, and the gateway mediation process is terminated 709. In the preferred embodiment for this invention, the shared memory object would be implemented via a Linux "named pipe".

Figure 8:
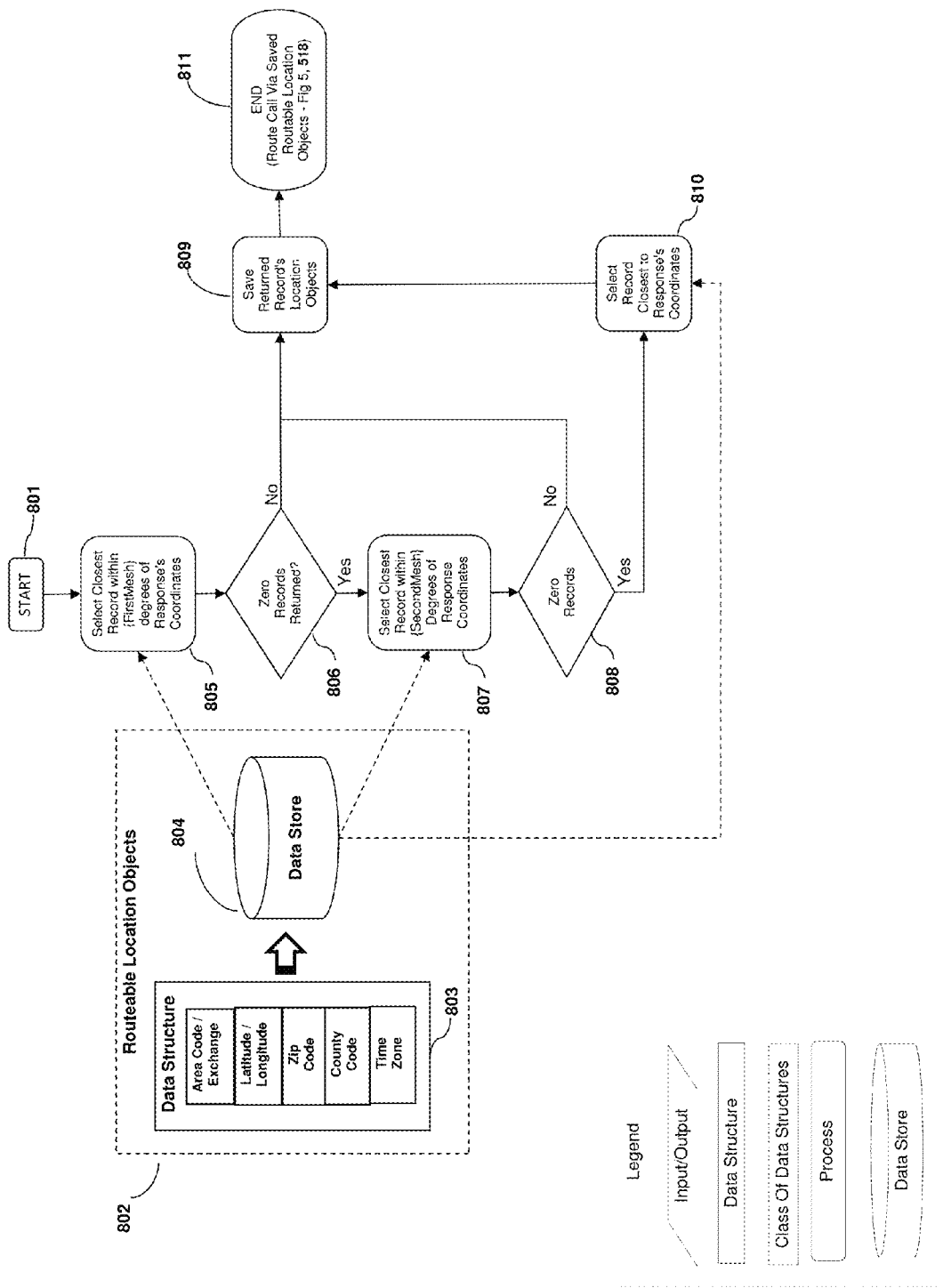
FIG. 8 illustrates a flow diagram of an embodiment for assigning to raw geographic data additional location data to route the incoming call.

FIG. 8 is a procedural flowchart showing the method for assigning to raw geographic coordinates, i.e., latitude and longitude of a given subscriber, additional location attributes which may be required to appropriately route a given telephone call. A table 802 containing a plurality of records with attributes 803 is placed in data store 804 so that it can be read by call routing processes. Table 802 contains one row for each unique pair of latitude and longitude coordinates associated with the "end offices" associated with the North American telecommunications network; other related location attributes can be added from any number of readily available commercial databases. The table 802 is indexed on latitude and longitude, to optimize the speed with which distances may be queried 805 and 807.

In 805, a query is issued to the on-net database server to a) compute the distances, using the standard formula from spherical geometry, between a caller's latitude and longitude coordinates and each record in table 802 whose latitude and longitude attributes lie within {FirstMesh} degrees, e.g., one degree, b) sort the distances in ascending sequence, and c) return at most a single record. If at least one record is returned 806, the related location attributes 803 that pertain to that record are saved into memory 809, for later use by the call routing service 518.

Otherwise, a second query is made, as above, but using a larger mesh {SecondMesh}, e.g., four degrees 807. If at least one record is returned 808, the related location attributes 803 that pertain to that record are saved into memory 809, for later use by the call routing service 518.

Otherwise, a third query is made 810, as above, with no restriction on the records' latitudes and longitudes, the related location attributes 803 that pertain to the row that is least distant are saved into memory 809, for further later use by the call routing service 518.

The following will illustrate the manner in which the invention addresses the problem of interfacing an interactive voice response session, where callers are known to abandon calls at an increasing rate as hold times rise, to a back-end web process with a wide and highly variable range of response times (it can take eight—sixteen seconds, or longer, to retrieve the caller's location). Since time is critical here, what is wanted is a technique which effectively decouples the two processes, allowing the call to route as soon as possible after the location has been received, and to route smoothly and quickly in case a response is not received in time.

For the purpose of this illustration, assume that the "On-Hold Sounds" table contains the rows shown on the below left, with the durations of each audio file's sound shown on the right:

| IDENTIFIER | AUDIO FILE POINTER | SEQUENCE # | SOUND DURATION |
|---|---|---|---|
| 1001 | 23001 | 1 | 3 seconds |
| 1001 | 23002 | 2 | 2 seconds |
| 1001 | 23003 | 3 | 1 second |
| 1001 | 23004 | 4 | 1 second |
| 1001 | 23005 | 5 | 1 second |

In this example, the sequence of events begins when a mobile subscriber who wants to order pizza dials 800-NEW-PIZZA (wanted number 800-639-7499), the inbound call is delivered to an IVR, and the resulting call routing process creates a gateway mediation process to handle the associated gateway request. All of these events usually occur within 2-5 seconds, during which the caller would hear silence; this amount of "post-dial delay" is typical of calls on the US telecommunications network.

The following table describes the experience of the caller thereafter, with the benefit of the subject invention, assuming that the off-net provider returns a response within eight seconds:

| THE IVR DOES THE FOLLOWING . . . | TIME REQUIRED | AND THE CALLER HEARS . . . |
|---|---|---|
| 1. Play a greeting to caller, per 509 | 6 seconds | "Thank you for calling 800-NEW-PIZZA. Please hold while we connect your call". |
| 2. Check gateway response queue | 10 milliseconds | Silence |
| 3. Play Seq #1 "on-hold" sound to the caller, per table specification 513 | 3 seconds | "On Hold" sound fragment-Sequence #1 |
| 4. Check gateway response queue | 10 milliseconds | Silence |
| 5. Route the call | | |

Without the subject invention, the IVR would have to wait a fixed and predetermined length of time for a response from the off-net service provider, calculated to be long enough that an acceptable proportion of new requests would typically be fulfilled by the provider, and all callers would be forced to wait on hold, for the same length of time, in order to garner the expected proportion of off-net provider responses. If the fixed wait time accounted for, say, 80% of responses, then by definition the majority of callers would be kept on hold, even though the IVR had already received a response. However, the subject invention allows the IVR to keep the caller's attention engaged by playing a seamless series of on-hold sound fragments, and to then route the call in close conjunction with the return response from the off-net service provider, which minimizes the time that callers spend on hold, and the associated abandon rate.

Further to the above example, if the off-net provider had required 6 seconds to return a response, the caller would not have heard any "on hold" sound fragments at all; the call would be routed, using the caller's coordinates, less than one second after the caller heard the greeting.

Further to the above example, if the off-net provider had required 12 seconds to return a response, the caller would have heard Sequence #'s 3-second "on hold" sound fragment, followed by Sequence #2's 2-second fragment and Sequence #3's 1-second fragments, before the call was routed using the caller's coordinates.

Further to the above example, if the off-net provider had required 30 seconds to return a response, the caller would have heard a Sequence #1's 3-second fragment, Sequence #2's 2-second fragment and Sequence #3, #4 and #5's 1-second fragments before the call was routed, via either an Operator 516 or via the location attributes of the caller's telephone number itself 514.

In accordance with various embodiments of the present invention, the methods described herein can be performed via operation of software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein may be optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission and wireless networking represent examples of the state of the art. Such standards are periodically superseded by faster or more efficient equivalents having essentially the same functions. Accordingly, replacement standards and protocols having the same functions are considered equivalents.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a USB key, a certificate, a perforated card, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as PHP, Java, Smalltalk, C++ or the like and conventional procedural programming languages, such as the "C" programming language or similar programming languages. The program code may execute entirely on the user's computer or a server, partly on the user's computer or a server, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present invention may be embodied in a field programmable gate array (FPGA).

Moreover, it is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A call system for bridging a communication connection between an initiator and a destination party based upon a current location of the initiator within a wireless communications network, the calling system comprising:

a communication interface configured to receive from the initiator an incoming communication directed to an identifier of the destination party, which identifies a number of different geographic locations in which the destination party is located;

an interactive unit configured to interact with off-network third party service providers via application gateways of the off-network third party service providers, the interactive unit comprising a communications control service operable to bridge at a communication interface the incoming communication of the initiator with one of the geographic locations of the destination party, based on the current location of the initiator;

a call routing process created by the communication control service to determine, based on a current location of the initiator, which of the geographic locations of the destination party the incoming communication should be directed;

a gateway mediation process created by the call routing process to communicate with at least one of the off-network third party service providers to inquire as to the current location of the initiator and to receive location data related to the initiator's current location, and to return the received location data to the call routing process;

the call routing process being further configured to determine the initiator's current location from the received location data, to determine to which of the different geographic locations in which the destination party is located is the one of the geographic locations of the destination party to which the incoming communication should directed, and to return the one of the geographic locations of the destination party to the communications control service; and the communications control services being further configured establish a terminating communication to the one of the geographic locations of the destination party based on the initiator's current location via the communications network interface, whereby the incoming communication and the terminating communication are bridged at the communication interface, wherein the incoming call does not originate over a land line device.

2. The call routing system in accordance with claim 1, wherein the incoming communication originates from one of a cell phone, voice over IP system, or the Internet.

3. The call routing system in accordance with claim 1, further comprising:

a database storing a plurality of sounds; and a processor configured to transmit at least some of the plurality of sounds to the initiator in a time period between the creation of the gateway mediation process and the response received from the off-network third party service providers.

4. The call routing system in accordance with claim 1, wherein, via peer creation, the gateway mediation process is created by a gateway request from the call routing process that comprises a request identifier and a service request payload.

5. The call routing system in accordance with claim 4, wherein the received location data returned to the call routing process from the gateway mediation process comprises the request identifier and a response payload comprising the received location data.

6. The call routing system in accordance with claim 4, wherein a separate gateway mediation process is created for each of the off-network third party location services.

7. The call routing system in accordance with claim 4, wherein new mediation processes are created for each new incoming communication.

8. The call routing system in accordance with claim 1, wherein, after returning the received location data to the call routing process, the gateway mediation process is terminated.

9. The call routing system in accordance with claim 1, wherein, after returning the one of the geographic locations of the destination party to the communications control service, the call routing process is terminated.

10. The call routing system in accordance with claim 1, wherein the received location data comprises at least a latitude and longitude for the initiator's current location.

11. The call routing system in accordance with claim 1, wherein the call routing process is configured to determine from the latitude and longitude of the initiator's current location to at least one of: an area code and exchange; a zip code; a county; and a time zone.

12. The call routing system in accordance with claim 1, wherein the identifier of the destination party is a toll free telephone number or an Internet website.

13. A method for bridging a communication connection between an initiator and a destination party based upon a current location of the initiator within a wireless communications network, the method comprising:

receiving from the initiator an incoming communication directed to an identifier of the destination party, which identifies a number of different geographic locations in which the destination party is located;

interacting, via an interactive unit comprising a communications control service, with off-network third party service providers via application gateways of the off-network third party service providers by:

creating a call routing process to determine, based on a current location of the initiator, which of the geographic locations of the destination party the incoming communication should be directed;

creating a gateway mediation process to communicate with least one of the off-network third party service providers to inquire as to the current location of the initiator and to receive location data related to the initiator's current location, and to return the received location data to the call routing process, wherein the call routing process further determines the initiator's current location from the received location data, determines to which of the different geographic locations in which the destination party is located is the one of the geographic locations of the destination party to which the incoming communication should directed, and returns the one of the geographic locations of the destination party to the communications control service; and establishing a terminating communication to the one of the geographic locations of the destination party based on the initiator's current location via the communications control service, whereby the incoming communication and the terminating communication are bridged at the interactive unit, wherein the incoming call does not originate over a land line device.

14. The method in accordance with claim 13, wherein the incoming communication originates from one of a cell phone, voice over IP system or the Internet.

15. The method in accordance with claim 13, wherein the returned received location data comprises data points in a coordinate system, and the method further comprises converting the data points to at least one of: an area code and exchange; a zip code; a county; and a time zone.

16. The method in accordance with claim 13, wherein the creating of the gateway mediation process comprises peer creation of a gateway request from the call routing process that comprises a request identifier and a service request payload.

17. The method in accordance with claim 13, wherein the received location data returned to the call routing process from the gateway mediation process comprises the request identifier and a response payload comprising the received location data.

18. The method in accordance with claim 13, wherein a separate gateway mediation process is created for each of the off-network third party location services.

19. The method in accordance with claim 13, wherein new mediation processes are created for each new incoming communication.

20. The method in accordance with claim 13, wherein, after returning the received location data to the call routing process, the method further comprises terminating the gateway mediation process.

21. The method in accordance with claim 13, wherein, after returning the one of the geographic locations of the destination party to the communications control service, the method further comprises terminating the call routing process.

* * * * *